United States Patent
Grace

(10) Patent No.: US 6,227,604 B1
(45) Date of Patent: May 8, 2001

(54) AUTO TOP CONVERSION FRAME ASSEMBLY

(75) Inventor: Ronald R. Grace, Hamilton, OH (US)

(73) Assignee: RKR Manufacturing, Inc., Hamilton, OH (US)

( * ) Notice: Subject to any disclaimer, the term of this patent is extended or adjusted under 35 U.S.C. 154(b) by 0 days.

(21) Appl. No.: 09/430,942

(22) Filed: Nov. 1, 1999

(51) Int. Cl.[7] .................. B60J 7/08; B60J 7/20; B60J 7/10
(52) U.S. Cl. .................. 296/107.09; 296/107.01; 296/107.8; 296/117; 296/121; 296/122
(58) Field of Search .................. 296/117, 107, 296/108, 121, 122

(56) References Cited

U.S. PATENT DOCUMENTS

| | | | |
|---|---|---|---|
| 2,768,857 | * | 10/1956 | Albrecht ............... 296/117 |
| 3,321,238 | * | 5/1967 | Brynn ................... 296/117 |
| 4,958,882 | * | 9/1990 | Kolb .................... 296/108 |
| 5,067,768 | * | 11/1991 | Fischbach ............... 296/107 |
| 5,558,389 | * | 9/1996 | Rothe et al. ............ 296/107 |
| 5,743,587 | * | 4/1998 | Alexander et al. ....... 296/108 |
| 5,785,375 | * | 7/1998 | Alexander et al. ....... 296/108 |
| 5,816,644 | * | 10/1998 | Rothe et al. ........... 296/107 |
| 5,967,590 | * | 10/1999 | Beierl et al. .......... 296/107.01 |
| 6,024,403 | * | 2/2000 | Ritter et al. .......... 296/117 |
| 6,039,382 | * | 3/2000 | Mather et al. .......... 296/107.01 |

* cited by examiner

Primary Examiner—D. Glenn Dayoan
Assistant Examiner—G Blankenship
(74) Attorney, Agent, or Firm—Charles R. Wilson

(57) ABSTRACT

Conversion of a hard top or half-hard top auto to an open-top auto is accomplished with a frame assembly and optional hatchback cap of the invention. The frame assembly is permanently mounted to the auto. It comprises a set of mounting plates for attachment to inside sidewalls of the auto, a stabilizer bar secured to the mounting plates and extending laterally across the auto, a set of main frame rails pivotally attached to the mounting plates and extending generally vertically, a pivot bar attached to the main frame rails and extending laterally across the auto, a set of secondary rail extensions with each pivotally attached to the pivot bar and a secondary cross rail secured to the secondary rail extensions and extending laterally across the auto. The frame assembly is collapsible about the pivot points into a seating area of the auto to give an open-top auto. The stabilizer bar helps to hold the hatchback cap in position. When erected, the frame assembly provides a support for a canvas top to cover the auto's seating area.

25 Claims, 11 Drawing Sheets

AUTO TOP CONVERSION FRAME ASSEMBLY

FIELD OF THE INVENTION

This invention relates to a frame assembly for use in an auto body-style conversion. More particularly, the invention relates to a frame assembly for converting a hard top or half-hard top auto to an open-top auto.

BACKGROUND OF THE INVENTION

Different styles of autos have been sold over the years. Hard top autos are the most common. The body of the auto can be viewed as one piece with a permanent hard top body panel extending over a driver and passenger seating area. Open-top autos are also well known. Most have a flexible canvas top which extends over the seating area, but additionally have the capability to be folded back to fully reveal the seating area. The canvas top can be on a frame assembly which itself is collapsible and can be retracted into a cavity of the auto. The canvas top can also be made to be manually removed and temporarily stored in a trunk area of the auto.

A limited number of autos have also been produced which have a half-hard top, variously referred to as targa tops, T-tops, and removable sun-roof tops. For example, a sports car of this type will have a rigid immovable back windshield and a canvas top which extends from a rigid front windshield to the rigid back windshield. The canvas top essentially covers the front seating area. It is attached to a frame of the auto by snap buttons or some other manually attaching means such that the canvas top is readily removed and reinstalled. A T-top auto has removable roof panels which are removed and temporarily stored to give an open-top auto. Autos with removable sun-roof tops are essentially the same in purpose and operation as the T-top autos. Still other auto styles are known which have a basic purpose of a removable roof to give the driver an open-air feel associated with a full convertible auto.

Some owners of certain auto makes desire to convert their auto from a hard top or half-hard top auto to a open-top auto. Generally, a more aesthetically pleasing or stylistic look is wanted. In accord with this need, there has now been developed a frame assembly for use in converting a hard top auto or half-hard top auto to an open-top auto. The frame assembly is readily attached to the auto with minimal alteration of the original auto. The conversion can be accomplished with ordinary skills and commonplace shop tools. The frame assembly of the invention permits a new look for the original auto.

SUMMARY OF THE INVENTION

A frame assembly is configured for converting a hard top or half-hard top auto to an open-top auto. The frame assembly is intended for permanent installation on the auto. It comprises a set of mounting plates for attachment to inside sidewalls of the auto. The frame assembly also comprises a stabilizer bar secured to the mounting plates, a set of main frame rails pivotally attached to the mounting plates, a pivot bar attached to the main frame rails, a set of secondary rail extensions with each pivotally attached to the pivot bar and a secondary cross rail secured to the secondary rail extensions. The frame assembly is collapsible about the pivot points into a seating area of the auto to give an open-top auto. An optional hatchback cap can be installed over the back seat area and pivotally attached to the stabilizer bar. When the frame assembly is fully erected, it provides a support for a canvas top to again enclose the passenger area.

BRIEF DESCRIPTION OF THE DRAWINGS

FIG. 10A is an exploded view of a fitting depicted by line 10A on FIG. 10.

DETAILED DESCRIPTION OF THE INVENTION

The frame assembly of the invention is described in detail in the following paragraphs and with reference to the drawings. The frame assembly is adapted, with minor dimensional changes, for use on many makes of autos including hard top autos and half-hard top autos to covert them to open-top autos. The auto of most interest because of constant body styling from year to year and ownership attitudes is the Porsche 911 Targa. It is a half-hard top auto with a targa top. The description which follows is directed to a frame assembly for use on the Porsche 911 Targa, but as aforementioned can be adapted for use on other auto makes and styles wherever a need and desire exists for the conversion.

Figure 1:
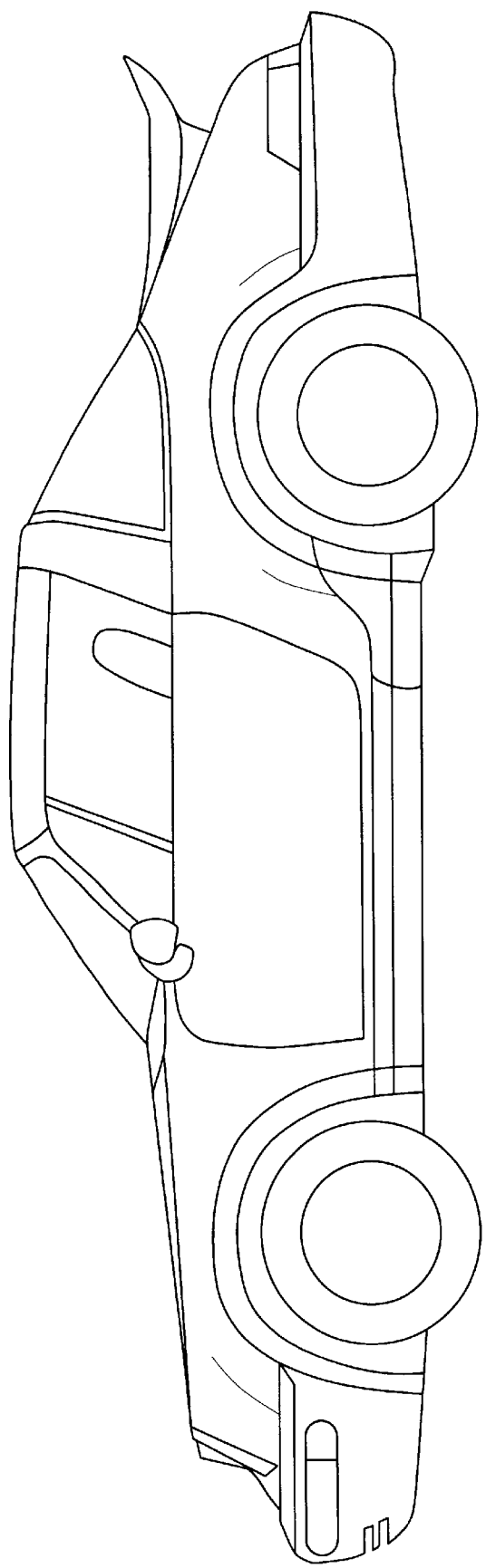
FIG. 1 is an environmental view of a prior art auto with a half-hard top.
Figure 2:
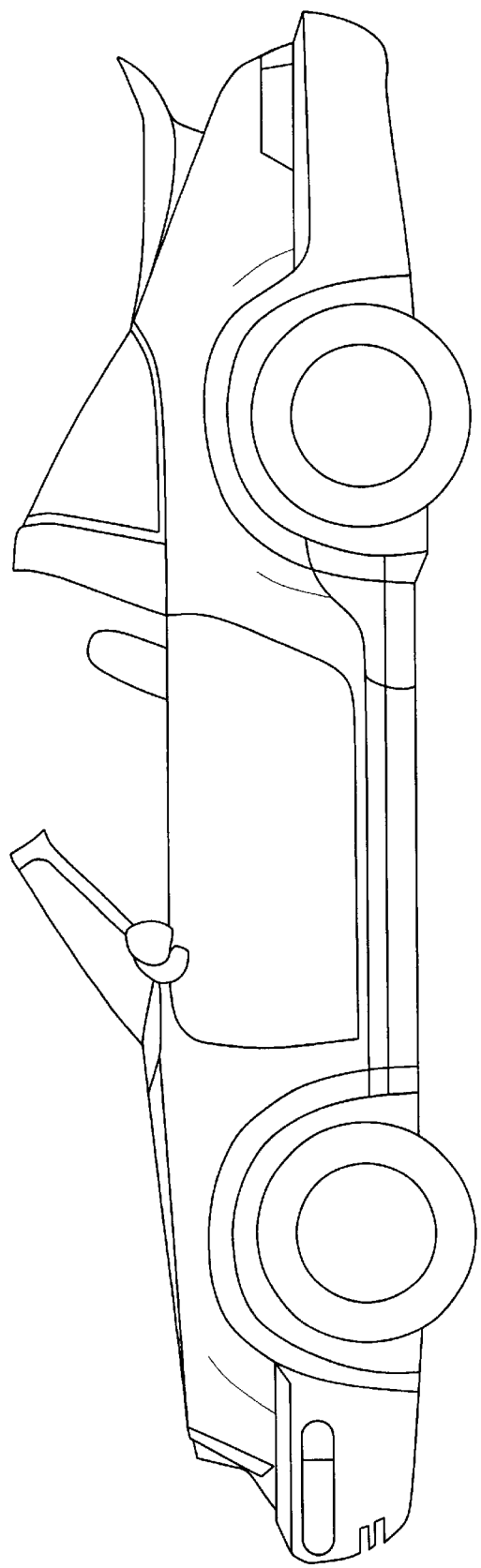
FIG. 2 is an environmental view of the prior art auto of FIG. 1 with its half-hard top removed to create an open-top auto.
Figure 3:
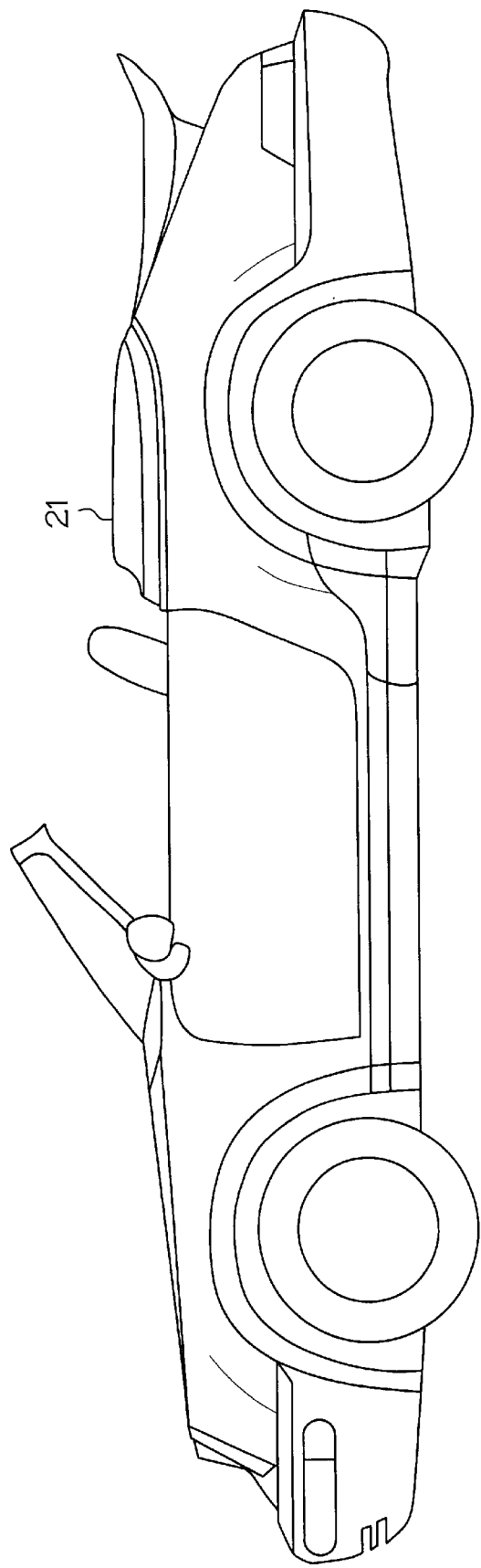
FIG. 3 is an environmental view of the auto of FIG. 1 altered and having the frame assembly of the invention with a hatchback cap installed.
Figure 4:
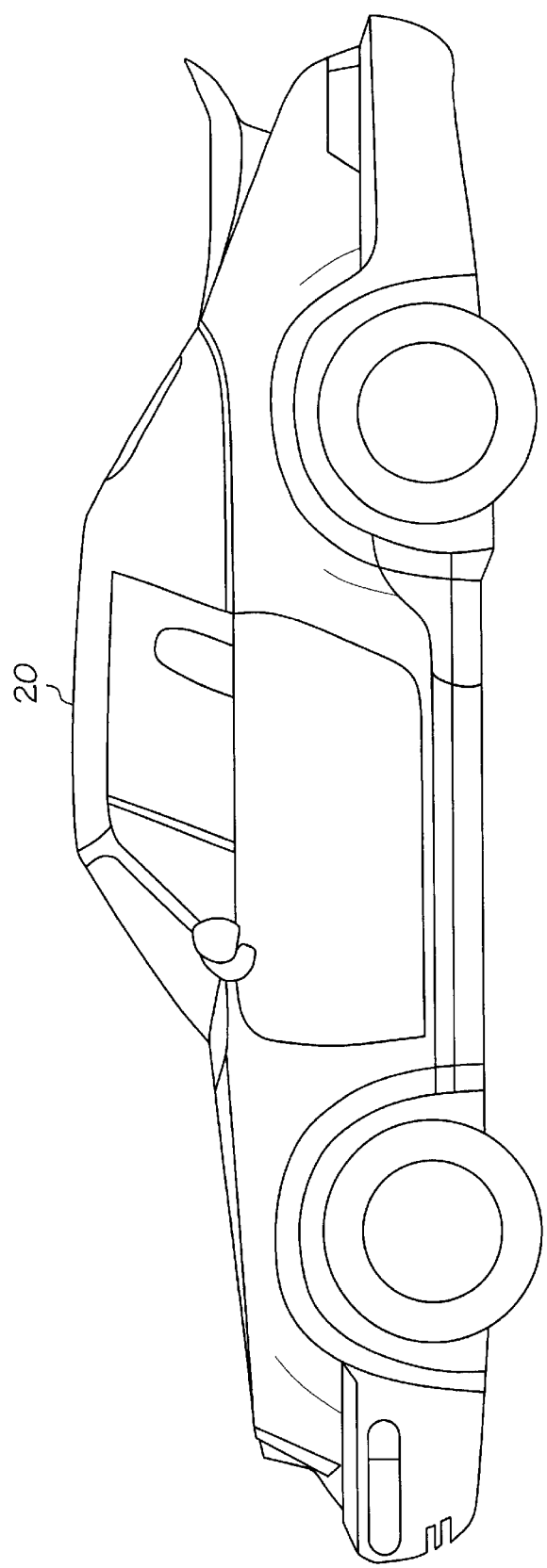
FIG. 4 is an environmental side view of the auto of FIG. 3 with the canvas top in place to cover the frame assembly and the hatchback cap.

With reference to the drawings, there is shown in FIG. 1 a currently available Porsche 911 Targa auto with a targa top in place. FIG. 2 shows the same auto with its targa top removed to create an open-top auto. In FIG. 3, the same auto is shown with its roof support posts and its rigid back windshield both removed and replaced with a frame assembly of the invention (in a folded down state out of view). A further modification of the invention is shown in FIG. 3 wherein a hatchback cap is added to the auto and secured to the frame assembly for a more streamlined look. FIG. 4 shows the same auto of FIG. 3 with the frame assembly fully erect and a canvas top in place over the frame assembly and the hatchback cap.

Figure 5:
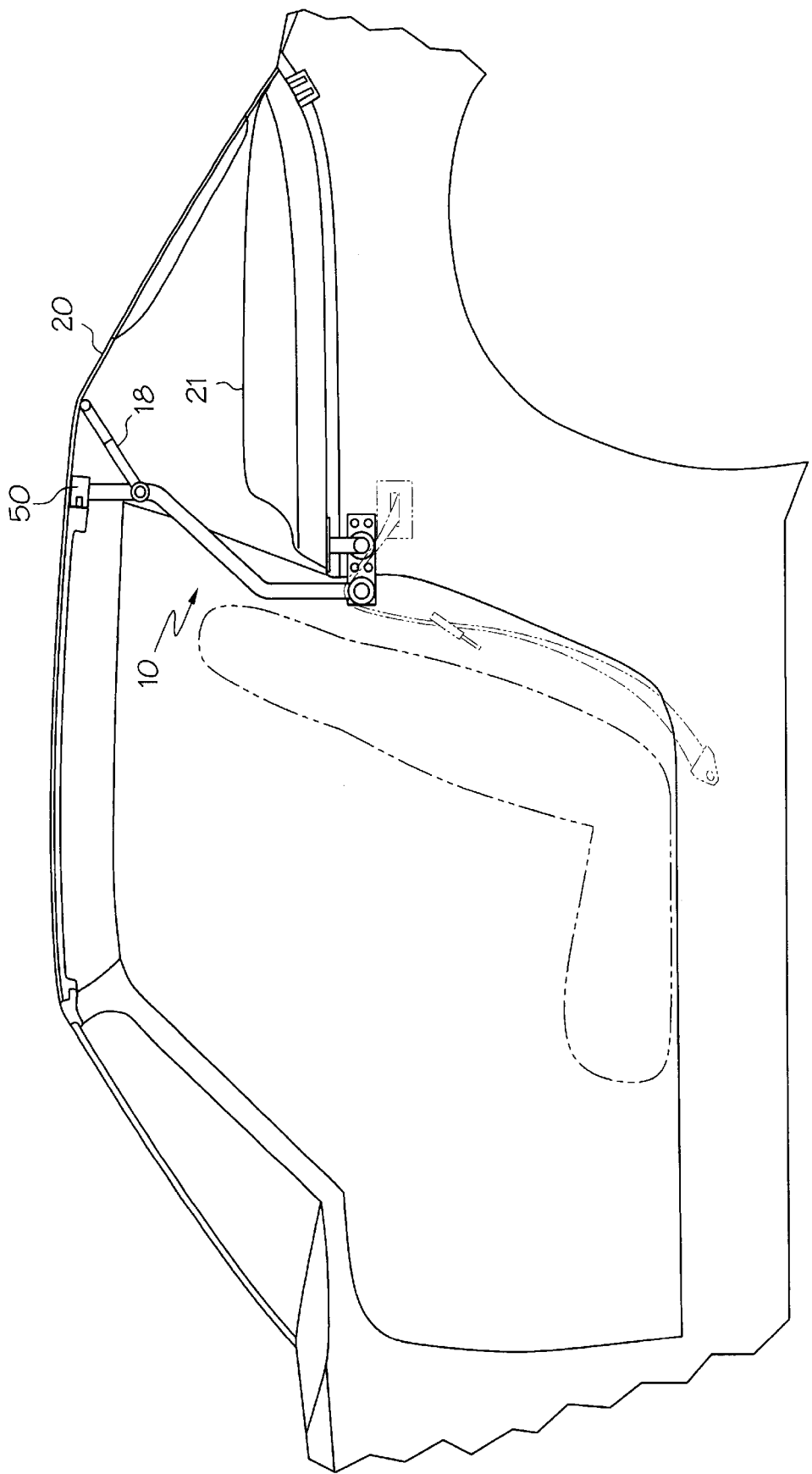
FIG. 5 is an elevational partial side view of the auto of FIG. 4 with a door removed to show its frame assembly.
Figure 6:
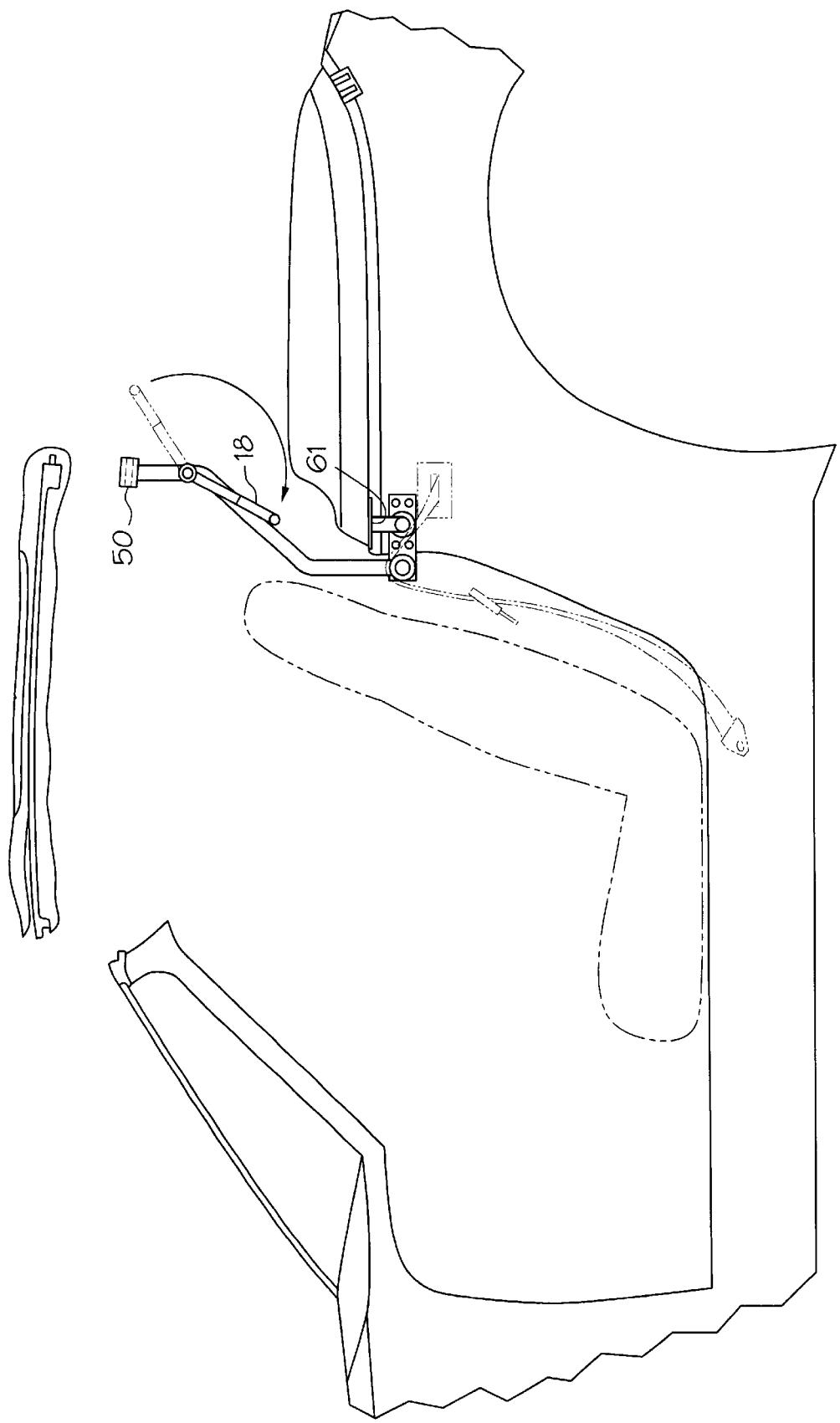
FIG. 6 is an elevational partial side view of the auto of FIG. 4 having its targa top in the process of being removed from the auto and further showing the frame assembly in a first stage of collapsing to a rest position.
Figure 7:
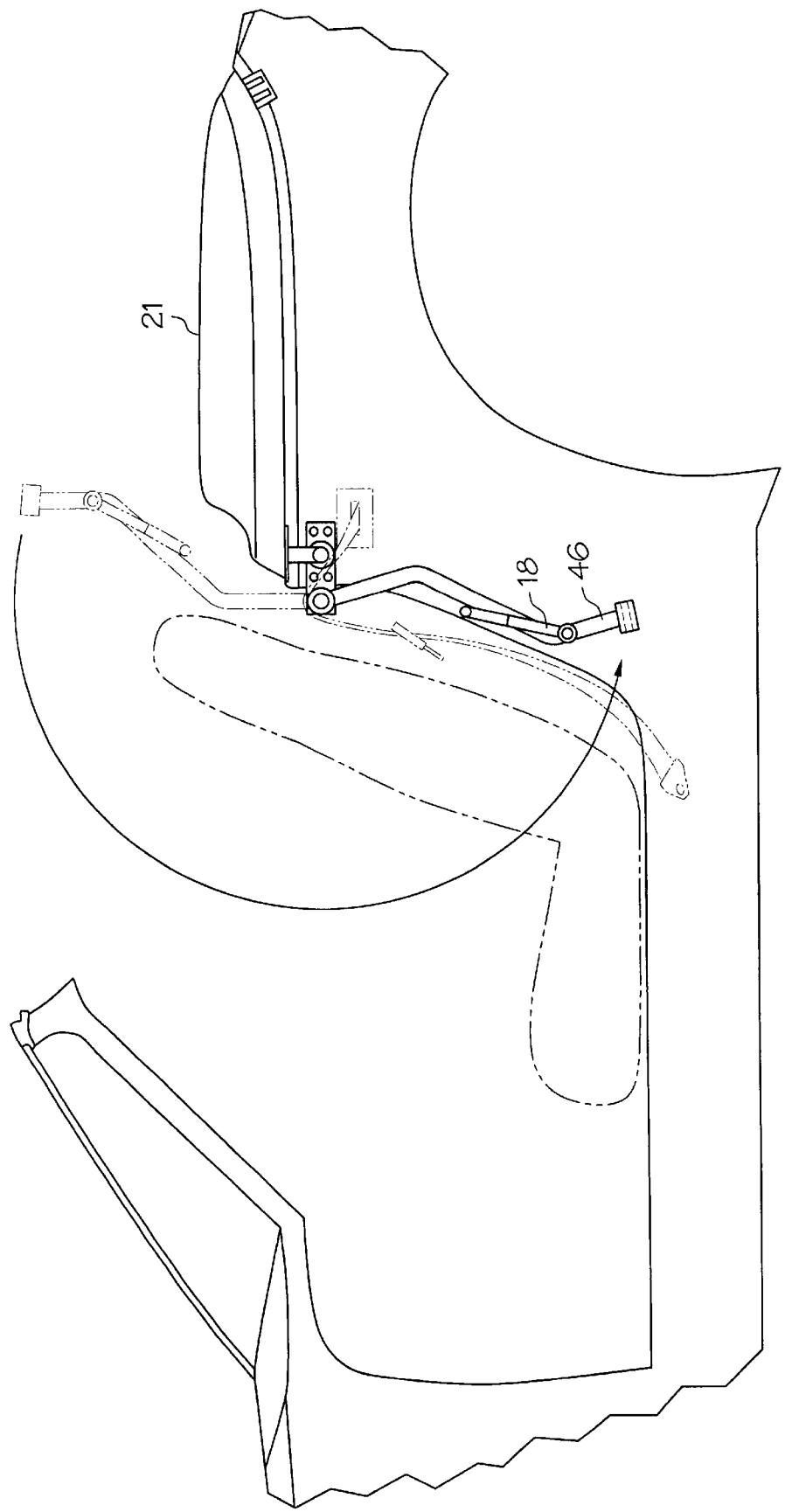
FIG. 7 is an elevational partial side view of the auto in FIG. 6 with the frame assembly in a second stage of collapsing to a full rest position.
Figure 9:
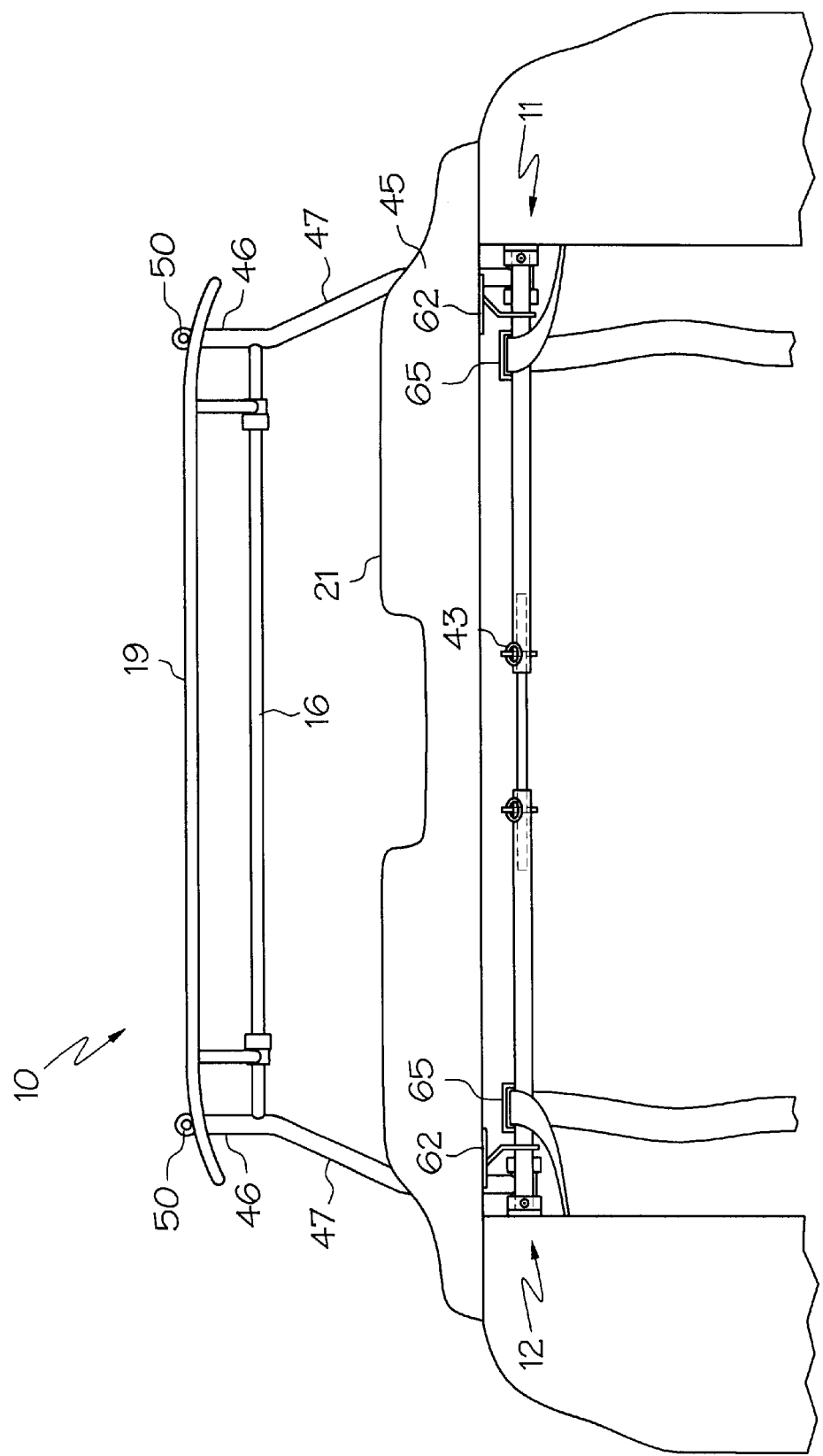
FIG. 9 is an elevational partial rear view of the frame assembly from the rear of the auto of FIG. 5 looking forwardly.
Figure 10:
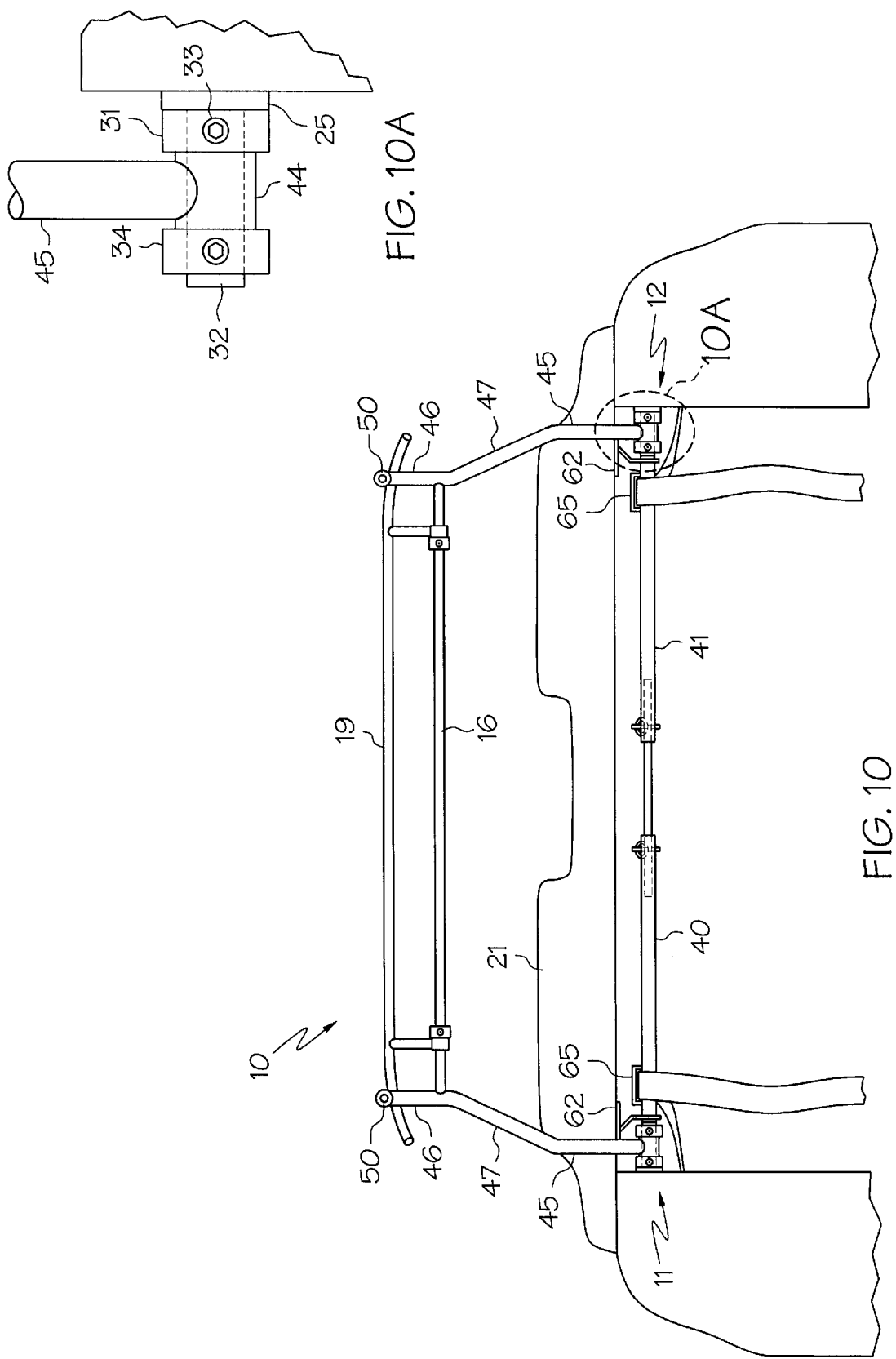
FIG. 10 is an elevational partial front view of the frame assembly from the front of the auto of FIG. 5 looking rearwardly.
Figure 11:
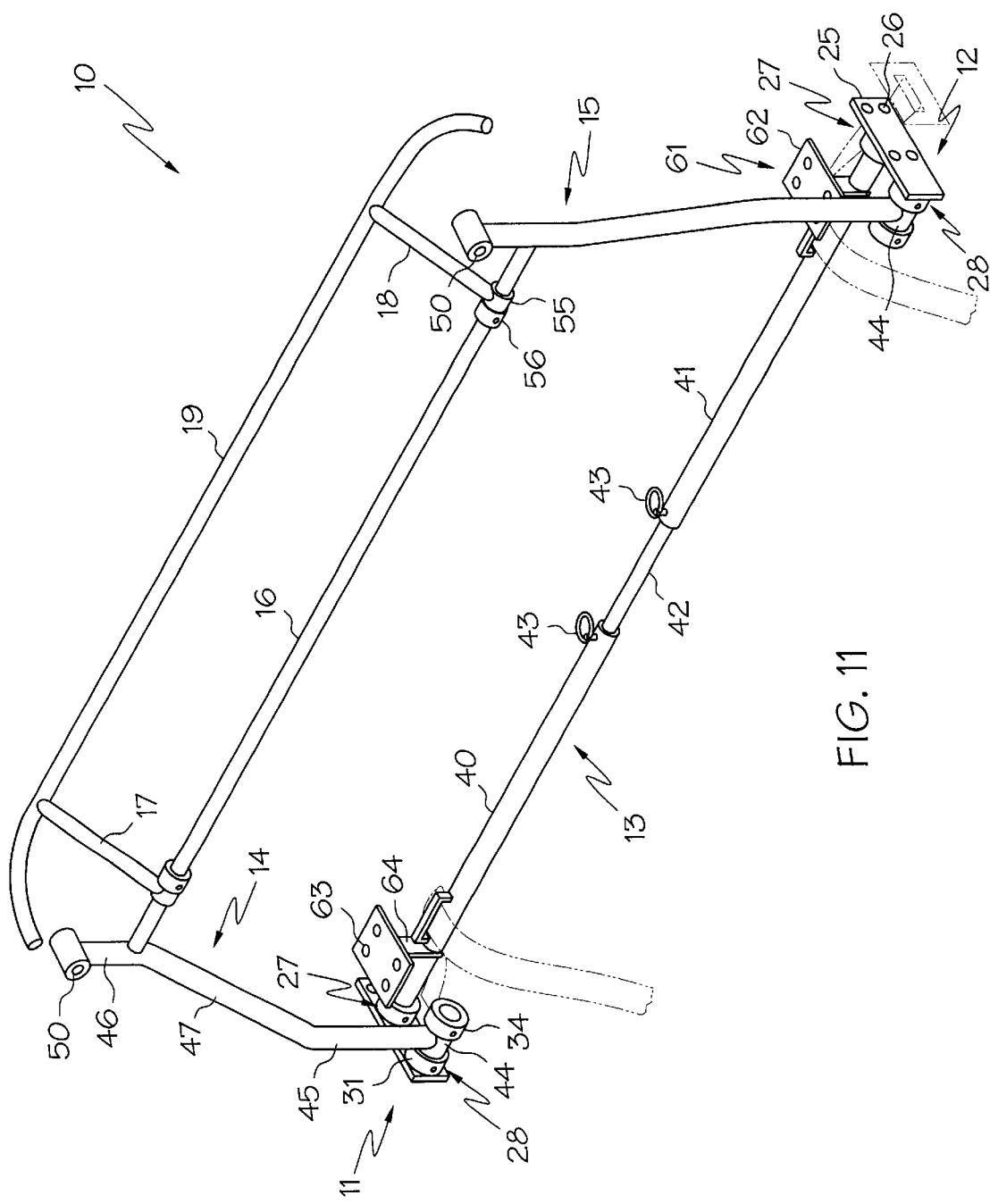
FIG. 11 is a view in perspective of the frame assembly of the invention in isolation.

FIGS. 5–10 show the frame assembly installed on an auto and FIG. 11 shows it in isolation from the auto. With reference to FIGS. 5–11, the frame assembly 10 of the invention comprises a set of mounting plates 11 and 12, a stabilizer bar 13 secured to the mounting plates 11 and 12, a set of main frame rails 14 and 15 pivotally mounted on the mounting plates 11 and 12, a pivot bar 16 secured to the main frame rails 14 and 15, a set of secondary rail extensions 17 and 18 pivotally mounted to the pivot bar 16, and a secondary cross rail 19 secured to the secondary rail extensions 17 and 18. As best seen in FIG. 5, the frame assembly 10 is fully erect and has a canvas top 20 stretched over it. As seen in FIG. 7, the frame assembly 10 has been folded down into the auto's passenger area to a full rest position and a hatchback cap 21 added for a more streamlined look. The hatchback cap 21 is attached to the stabilizer bar of the frame assembly 10 as further discussed below. Each of the components of the frame assembly 10 and their interactions are described in the following paragraphs.

Initially, the auto must be altered to accommodate the frame assembly 10 of the invention. A rigid back windshield is removed by prying it from its mounting strip. Roof support posts permanently attached to the Porsche 911 Targa auto by the manufacturer are removed by sawing them from points of attachment to the auto's body. Once removed, the auto is ready for installation of the frame assembly 10. The components of the frame assembly 10 are essentially assembled on the auto for optimum stability. The frame assembly 10 can the manufactured off-site and attached as a whole to the auto, though this is less preferred because of dimension variations in autos even of the same make and type and because of the need for a well fitting tight structure.

As best seen in FIGS. 5 and 10, the mounting plates 11 and 12 are attached to inside sidewalls of the auto near a top of the auto body and directly behind the front passenger seats. They are permanently secured on opposing sidewalls at the same height. The auto's right side mounting plate 11 and the left side mounting plate 12 are identical in structure. With reference to FIG. 11, each mounting plate has a generally rectangular-shaped steel plate 25 with screw holes 26 for receiving body attaching screws. Each mounting plate has a fitting 27 in a mid-section for receiving a terminus of the stabilizer bar 13 and a fitting 28 in another part of the mid-section for receiving one of the main frame rails 14 or 15. The fittings 27 are cylindrical-shaped collars which have a flat back wall welded to the steel plate 25, though each could be permanently secured in other known manners. Each collar further has a diameter approximately equal to that of the stabilizer bar 13. A set screw (not shown) extending through each of the collars is used to hold the stabilizer bar 13 in place. Each of the fittings 28 provides a means for pivotally holding the main frame rails to the mounting plates. With reference to FIG. 10A, a cylindrical-shaped collar 31 has its back face welded to the mounting plate. A bar stub 32 is positioned in the collar 31 and held there by use of a set screw 33. A trapping collar 34 traps the bar stub 32 in place. A leg from the main rail 15 has a fitting to fit over the bar stub 32 as discussed below.

The stabilizer bar 13 is dimensioned to extend across the auto. A first terminus of the bar fits into the fitting 27 of the mounting plate 11 and a second terminus of the bar fits into the fitting 27 of the mounting plate 12. The stabilizer bar preferably is a steel tube with a diameter of about one inch.

Preferably, the stabilizer bar 13 includes a length adjusting means to allow for auto width variations. An example of a suitable length adjusting means for a hollow stabilizer bar is an adjusting rod having a diameter slightly smaller than the inside diameter of the stabilizer bar. As seen in FIGS. 10 and 11, the stabilizer bar 13 has a first section 40 with a terminus mounted in the mounting plate 11, a second section 41 with a terminus mounted in the mounting plate 12 and the adjusting rod 42 extending at one end into the interior of the first section 40 and at the other end into the interior of the second section 41. Set pins 43 are used to hold the adjusting rod 42 in place. During installation, the adjusting rod 42 is loosely fitted into the first and second sections of the stabilizer bar. Each free end of the first and second sections is secured to one of the mounting plates by the set screws. Next, the adjusting rod 42 is approximately centered, holes drilled, and the set pins 43 forced through holes in the stabilizer bar sections and adjusting rod. The stabilizer bar when properly installed serves to hold the auto body sidewalls apart and provide a stabilizing effect to the sidewalls. Also, as will be apparent from a discussion of the hatchback cap below, the stabilizer bar is used to receive fittings for the cap and allow it to pivot upwardly from the stabilizer bar to access the area under the cap.

Again with reference to FIGS. 9, 10 and 11, the main frame rails 14 and 15 are pivotally mounted on the mounting plates 11 and 12. 20 A terminus of the main frame rail 14 is mounted on the fitting 28 of mounting plate 11 and a terminus of the main frame rail 15 is mounted on the fitting 28 of mounting plate 12. Each rail is mounted to pivot in a direction generally transverse to the longitudinal axis of the stabilizer bar 13. Again with reference to FIG. 10A, a terminus of each main frame rail has a pivot collar 44 permanently attached at a horizontal right angle and dimensioned to fit over the bar stub 32 of the fitting 28 and allow the pivoting movement. A stop is operably associated with each of the main frame rails to limit their rotation and stabilize them once in place.

The main frame rails 14 and 15 are essentially identical. Each is an elongated bar having three legs. A first leg 45 and a third leg 46 extend in about the same direction with a second leg 47 being angled to the first leg 45 and angled to the third leg 46. Preferably, the second leg 47 is angled in two directions so that it extends more rearwardly and inwardly than the first leg 45. In effect, the second leg 47 causes the first and third legs to be offset from one another. The three legs are about equi-length. They are one piece as shown, though can be three separate legs joined together by suitable joining means, including bolts and nuts, welds, and couplings.

As seen in FIGS. 5, 10 and 11, the main frame rails 14 and 15 are provided with pin receiving latching receptacles 50 near the third leg's terminus. The receptacles are on forward-facing walls of the main frame rails. They are to receive protruding pins 20 normally found on targa tops and help to hold the targa top in position when needed.

The pivot bar 16 is permanently secured to the main frame rails 14 and 15 to extend laterally across the auto, substantially parallel to the stabilizer bar 13. It provides a point of attachment for the secondary rail extensions 17 and 18 as well as adds another measure of stability to the frame assembly 10. As shown, the pivot bar 16 is straight. It can as well be bowed up or bowed down at least in a mid-section to remove any rear vision impairment. Alternatively, the pivot bar 16 can be replaced by a shortened bar of about six to ten inches which extends from the main frame rail 14 and another shortened bar of about six to ten inches which extends from the main frame rail 15.

Extending from the pivot bar 16 are the secondary rail extensions 17 and 18, respectively. Each of the secondary rail extensions is a substantially straight bar which is pivotally mounted on the pivot bar 16. A pivot collar 55 having an inside diameter slightly greater than the outside diameter of the pivot bar is permanently attached, e.g. by welding to the terminus each of the secondary rail extensions. The secondary cross rail 19 together with the attached secondary rail extensions 17 and 18 are then mounted onto the pivot bar 16 by slipping either of the pivot collars 55 onto one end of the pivot bar 16 and sliding it laterally sufficiently for the other pivot collar 55 to reach and then slide laterally along the secondary cross rail 19. The pivot collars are both slid along the pivot bar 16 until the rail extensions 17 and 18 are approximately centered on the pivot bar. This is accomplished prior to the pivot bar's attachment to the main frame rails 14 and 15. A locking collar 56 is positioned adjacent each pivot collar 55 and secured in place to keep the secondary rail extensions in place and the secondary cross rail properly centered. A stop is used to limit rotation of the secondary rail extensions. The secondary cross rail 19 is secured to distal terminuses of the secondary rail extensions. The secondary rail extensions and cross rail together support the canvas top. Additionally, the secondary cross rail 19 defines a break-point for the canvas top which is closer to the rear of the auto and, accordingly, gives a more sleek look. The secondary cross rail 19 extends laterally across the auto and is permanently attached to the two secondary rail extensions. Preferably, as evident in FIG. 10, the secondary cross rail 19 is slightly bowed or arch-shaped upwardly and has downturned ends to give a smooth shape to the canvas top.

Once the frame assembly is installed on the auto, the original targa top can be reinstalled. Latching means normally found on the front and rear of the targa top are used without further modification. That is, as seen in FIG. 5, a protruding pin extending substantially horizontally and rearwardly from the original targa top mates with the afore-described receptacle openings 50 found in each of the main frame rails. Thereafter, a canvas top can be stretched over the targa top, over the secondary cross rail 19 and attached in the back area of the auto's body.

Figure 8:
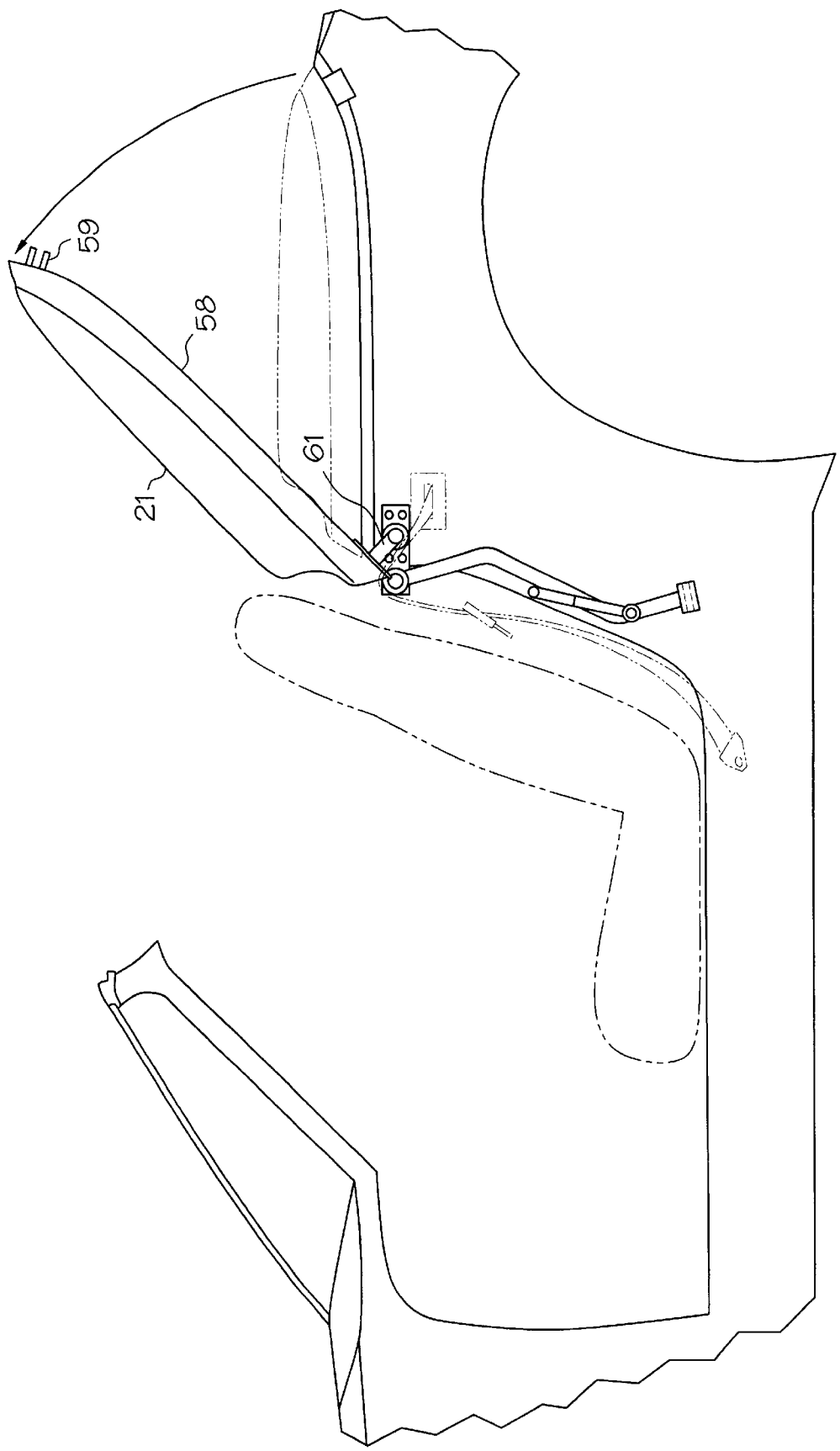
FIG. 8 is an elevational partial side view of the auto of FIG. 7 showing the hatchback cap tilted upwardly to access a back seat area of the auto.

An optional, though highly preferred feature of the invention is the hatchback cap 21 which is configured to fit onto the auto body and cover the back seat area. Its unique appearance is presented when the canvas top and targa top are removed to give the open-top auto. With reference to FIGS. 3, 5 and 8, the hatchback cap 21 is generally an open bottom curvilinear half-egg shaped structure 58 made of fibrous reinforced resinous material which has a raised front section and which slopes downwardly to a low profile back section. A locking mechanism 59 located at an edge on the back section cooperates with the auto body to lock the hatchback cap in place during use. Mating hook and loop fasteners better known as VELCRO are also suitable for this purpose.

In accord with a preferred embodiment of the invention, the hatchback cap 21 is mounted to pivot about its front edge to access the back seat area of the auto. Reference is made to FIG. 8. With further reference to FIG. 11, a pivot member 61 is attached near each terminus of the stabilizer bar 13. Each pivot member 61 has a generally rectangular-shaped plate 62 with screw holes 63. The plate 62 has a bracket extending from an underside. The bracket 64 has a distal terminus which extends around the stabilizer bar 13 to freely rotate. As apparent, the hatchback cap 21 is attached by screws at a front edge to the pivot plates 62.

The hatchback cap alternatively has two sets of downwardly extending prongs in a front lip to engage the stabilizer bar. The prongs are biased inwardly to remain on the stabilizer bar once properly positioned. In effect, the prongs allow the hatchback cap to be raised from the rear and pivot about the stabilizer bar, for example to gain access to the rear seat area.

An optional feature of the frame assembly is the inclusion of are seat belt brackets 65. As seen in FIGS. 9 and 10, two of the brackets are mounted on the stabilizer bar 13. Each has an inverted U-shape, with one mounted on the stabilizer bar near one terminus to accommodate a driver seat belt and the other mounted near the other stabilizer bar terminus to accommodate a front seat passenger seat belt.

In use, the auto owner has a choice of driving the auto equipped with the frame assembly of the invention in either an open-top mode or targa top with canvas top mode. For the open-top mode, the auto owner manually removes the canvas top and the targa top. The secondary rail extensions of the frame assembly are swung downwardly as seen in FIG. 6 and then the whole assembly is swung wnwardly as seen in FIG. 7. The open-top auto depicted in FIG. 3 is presented. For the targa top and canvas top mode, the frame assembly is swung upwardly until fully erect as seen in FIG. 5. The targa top is reinstalled and the canvas top added, also as seen in FIG. 5.

Having described the invention in its preferred embodiment, it should be clear that modifications can be made without departing from the spirit of the invention. It is not intended that the the words used to describe the invention nor the drawings illustrating the same be limiting on the invention. It is intended that the invention only be limited by the scope of the appended claims.

I claim:

1. A frame assembly for converting a hard top auto or half-hard top auto to an open-top auto, said assembly comprising:
    (a) a set of mounting plates, each of said set of mounting plates for attachment to opposed inside side walls of the auto;
    (b) a stabilizer bar having a first terminus secured to one of the mounting plates and a second terminus secured to the other of the mounting plates;
    (c) a set of main frame rails, each main frame rail of said set of main frame rails pivotally mounted on one of the mounting plates to move from an internal storage position to a fully erect position and further wherein each main frame rail of said set of main frame rails has a latching receptacle for receiving a protruding pin on a hard top or half-hard top for holding said hard top or half-hard top to the frame assembly;
    (d) a pivot bar attached to each main frame rail of the set of main frame rails;
    (e) a set of secondary rail extensions, each secondary rail extension of said set of secondary rail extensions pivotally mounted to the pivot bar; and
    (f) a secondary cross rail secured to the secondary rail extensions to define a break-point and provide support for a flexible canvas top.

2. The frame assembly of claim 1 further wherein the stabilizer bar includes an adjusting means to adjust the length of said stabilizer bar for extending fully across the inside of the auto and provide a stabilizing force to sidewalls of the auto to prevent them from collapsing inwardly.

3. The frame assembly of claim 2 further wherein the stabilizer bar has a set of brackets attached thereto, each bracket of said set of brackets having a generally inverted U-shape and wherein one of said brackets of said set of brackets is attached near the first terminus of the stabilizer bar and the other of said brackets of said set of brackets is attached near the second terminus of the stabilizer bar, wherein said brackets are for accommodating seat belt straps used in a front seat of the auto.

4. The frame assembly of claim 2 wherein the stabilizer bar is generally circular when viewed in a cross-section transverse to its longitudinal axis.

5. The frame assembly of claim 4 further comprising a hatchback cap of fibrous reinforced resinous material to fit over a back seat area of the hard top or half-hard top auto, said hatchback cap having attachment means and pivotally attached to the stabilizer bar.

6. The frame assembly of claim 1 wherein each main frame rail of the set of main frame rails has three elongated legs with a first leg pivotally attached to one of the mounting plates, a second leg angled from the first leg and a third leg extending from the second leg and off-set from the first leg.

7. The frame assembly of claim 6 wherein each secondary rail extension of said set of secondary rail extensions is pivotally attached to the pivot bar near a junction of the pivot bar and each main frame rail of the set of main frame rails for moving from a fully extended position for supporting the flexible canvas top to a folded down position for internal storage purposes.

8. The frame assembly of claim 7 wherein the secondary cross rail is arch-shaped to provide a smooth laterally curved support for the flexible canvas top.

9. A frame assembly for converting a hard top auto or half-hard top auto to an open-top auto, said assembly comprising:
(a) a set of mounting plates, each of said set of mounting plates for attachment to opposed inside side walls of the auto;
(b) a stabilizer bar having a first terminus secured to one of the mounting plates and a second terminus secured to the other of the mounting plates;
(c) a set of main frame rails, wherein each main frame rail of said set of main frame rails is pivotally mounted on one mounting plate of said set of mounting plates to move in a direction generally transverse to a longitudinal axis of the stabilizer bar from an internal storage position to a fully erect position and further wherein each main frame rail of said set of main frame rails has a latching receptacle for receiving a protruding pin on a hard top or half-hard top for holding said hard top or half-hard top to the frame assembly;
(d) a pivot bar having a first terminus attached to one main frame rail of said set of main frame rails and a second terminus attached to the other main frame rail of said set of main frame rails;
(e) a set of secondary rail extensions, each secondary rail extension of said set of secondary rail extensions pivotally mounted to the pivot bar; and
(f) a secondary cross rail secured to the set of secondary rail extensions to provide support for a flexible canvas top.

10. The frame assembly of claim 9 further wherein the stabilizer bar includes an adjusting means to adjust the length of said stabilizer bar for extending fully across the inside of the auto and provide a stabilizing force to sidewalls of the auto to prevent them from collapsing inwardly.

11. The frame assembly of claim 10 wherein the stabilizer bar is hollow and comprises a first section and a second section with an adjusting rod of slightly less diameter positioned in each of the first and second sections and secured in place by set pins.

12. The frame assembly of claim 11 further comprising a hatchback cap of fibrous reinforced resinous material to fit over a back seat area of the hard top or half-hard top auto, said hatchback cap having attachment means and pivotally attached to the stabilizer bar.

13. The frame assembly of claim 12 further wherein the stabilizer bar has a set of pivot members attached thereto, with one of said set of pivot members attached near the first terminus of the stabilizer bar and the other of said set of pivot members attached near the second terminus of the stabilizer bar, said set of pivot members for accommodating a hatchback cap.

14. The frame assembly of claim 9 wherein each main frame rail of the set of main frame rails has three elongated legs with a first leg pivotally attached to one of the mounting plates, a second leg angled from the first leg and a third leg extending from the second leg and off-set from the first leg.

15. The frame assembly of claim 9 wherein each secondary rail extension of said set of secondary rail extensions is pivotally attached to the pivot bar near a junction of the pivot bar and each main frame rail of the set of main frame rails so as to move from a fully extended position for supporting the flexible canvas top to a folded down position essentially juxtaposed with the third leg of the main frame rail for internal storage purposes.

16. The frame assembly of claim 15 wherein the secondary cross rail is arch-shaped to provide a smooth laterally curved support for the flexible canvas top.

17. A frame assembly for converting a hard top auto or half-hard top auto to an open-top auto, said assembly comprising:
(a) a set of mounting plates, each of said mounting plates of said set of mounting plates for attachment to opposed inside side walls of the auto;
(b) a stabilizer bar having a first terminus secured to one of the mounting plates and a second terminus secured to the other of the mounting plates;
(c) a set of main frame rails, wherein each main frame rail of said set of main frame rails is pivotally mounted on one of the mounting plates to move from an internal storage position to a fully erect position;
(d) a pivot bar attached to each main frame rail of the set of main frame rails;
(e) a set of secondary rail extensions, wherein each secondary rail extension of said set of secondary rail extensions is pivotally mounted to the pivot bar;
(f) a secondary cross rail secured to each secondary rail extension of the set of secondary rail extensions to define a break-point and provide support for a flexible canvas top; and
(g) a hatchback cap of fibrous reinforced resinous material for fitting over a back seat area of the hard top or halfhard top auto, further said hatchback cap having attachment means for pivotally attaching to the stabilizer bar.

18. The frame assembly of claim 17 further wherein the stabilizer bar includes an adjusting means to adjust the length of said stabilizer bar for extending fully across the inside of the auto and provide a stabilizing force to sidewalls of the auto to prevent them from collapsing inwardly.

19. The frame assembly of claim 18 wherein each secondary rail extension of the set of secondary rail extensions is pivotally attached to the pivot bar near a junction of the pivot bar and each main frame rail of the set of main frame rails so as to move from a fully extended position for supporting the flexible canvas top to a folded down position for internal storage purposes.

20. The frame assembly of claim 19 wherein the secondary cross rail is arch-shaped to provide a smooth laterally curved support for the flexible canvas top.

21. The frame assembly of claim 17 further wherein each of the main frame rails of the set of main frame rails has a latching receptacle for receiving a protruding pin on a targa top for holding the targa top to the frame assembly.

22. A frame assembly for converting a hard top auto or half-hard top auto to an open-top auto, said assembly comprising:

(a) a set of mounting plates, each of said set of mounting plates for attachment to opposed inside side walls of the auto;

(b) a stabilizer bar having a first terminus secured to one of the mounting plates and a second terminus secured to the other of the mounting plates, further wherein the stabilizer bar is hollow and comprises a first section and a second section with an adjusting rod of slightly less diameter positioned in each of the first and second sections and secured in place by set pins;

(c) a set of main frame rails, wherein each main frame rail of said set of main frame rails is pivotally secured to one of the mounting plates to move in a direction generally transverse to a longitudinal axis of the stabilizer bar from an internal storage position to a fully erect position;

(d) a pivot bar having a first terminus attached to one main frame rail of said set of main frame rails and a second terminus attached to the other main frame rail of said set of main frame rails;

(e) a set of secondary rail extensions, each secondary rail extension of said set of secondary rail extensions pivotally mounted to the pivot bar; and (f) a secondary cross rail secured to each secondary rail extension of the set of secondary rail extensions to provide support for a flexible canvas top.

23. The frame assembly of claim 22 wherein each secondary rail extension of the set of secondary rail extensions is pivotally attached to the pivot bar near a junction of the pivot bar and each main frame rail of the set of main frame rails so as to move from a fully extended position for supporting the canvas top to a folded down position essentially juxtaposed with the third leg of the main frame rail for internal storage purposes.

24. The frame assembly of claim 23 wherein the secondary cross rail is arch-shaped to provide a smooth laterally curved support for the flexible canvas top.

25. The frame assembly of claim 24 further wherein each main frame rail of the set of main frame rails has a latching receptacle for receiving a protruding pin on a targa top for holding the targa top to the frame assembly.

* * * * *